(12) United States Patent
Josephson

(10) Patent No.: US 12,133,544 B2
(45) Date of Patent: Nov. 5, 2024

(54) COMPOSITION COMPRISING TASTE MODULATION COMPOUNDS, THEIR USE AND FOODSTUFF COMPRISING THEM

(71) Applicant: V. MANE FILS, Le Bar sur Loup (FR)

(72) Inventor: Dave Josephson, Lebanon, OH (US)

(73) Assignee: V. Mane Fils, Le Bar sur Loup (FR)

( * ) Notice: Subject to any disclaimer, the term of this patent is extended or adjusted under 35 U.S.C. 154(b) by 0 days.

(21) Appl. No.: 15/749,983

(22) PCT Filed: Aug. 5, 2016

(86) PCT No.: PCT/IB2016/001305
§ 371 (c)(1),
(2) Date: Feb. 2, 2018

(87) PCT Pub. No.: WO2017/025810
PCT Pub. Date: Feb. 16, 2017

(65) Prior Publication Data
US 2018/0228191 A1     Aug. 16, 2018

Related U.S. Application Data

(60) Provisional application No. 62/202,538, filed on Aug. 7, 2015.

(51) Int. Cl.
| | | |
|---|---|---|
| A23L 27/00 | (2016.01) | |
| A23G 1/32 | (2006.01) | |
| A23L 2/56 | (2006.01) | |
| A23L 23/00 | (2016.01) | |
| A23L 27/20 | (2016.01) | |
| A23L 27/60 | (2016.01) | |
| A23L 29/00 | (2016.01) | |

(52) U.S. Cl.
CPC ............... *A23L 27/88* (2016.08); *A23G 1/32* (2013.01); *A23L 2/56* (2013.01); *A23L 23/00* (2016.08); *A23L 27/202* (2016.08); *A23L 27/204* (2016.08); *A23L 27/66* (2016.08); *A23L 27/84* (2016.08); *A23L 27/86* (2016.08); *A23L 29/03* (2016.08); *A23V 2002/00* (2013.01)

(58) Field of Classification Search
None
See application file for complete search history.

(56) References Cited

U.S. PATENT DOCUMENTS

| | | |
|---|---|---|
| 4,096,158 A | 6/1978 | Evers et al. |
| 4,917,913 A | 4/1990 | Buckholz, Jr. et al. |
| 5,683,737 A | 11/1997 | Erickson et al. |
| 6,391,364 B1 | 5/2002 | Lindsay |
| 2008/0292765 A1* | 11/2008 | Prakash .................. A23L 27/88 426/548 |
| 2010/0233102 A1 | 9/2010 | Krammer et al. |
| 2013/0115356 A1 | 5/2013 | Gelin et al. |

FOREIGN PATENT DOCUMENTS

| | | | |
|---|---|---|---|
| CA | 821490 | 8/1969 | |
| JP | 3068609 | 7/2000 | |
| JP | 2012070636 | 4/2012 | |
| JP | 2013039083 | 2/2013 | |
| WO | WO-2013135511 A1 * | 9/2013 | ........... C07C 233/65 |
| WO | WO-2015014609 A1 * | 2/2015 | ........... C07D 403/12 |

OTHER PUBLICATIONS

C. Ubeda et al: "Characterization of odour active compounds in strawberry vinegars", Flavour and Fragrance Journal., vol. 27, No. 4, Jul. 24, 2012 (Jul. 24, 2012), pp. 313-321, XP055332147, GB ISSN: 0882-5734, DOI: 10.1002/ffj.3103 p. 319, left-hand col. paragraph 4; table 1.
International Search Report for PCT/IB2016/001305, dated Mar. 17, 2017.
Written Opinion for PCT/IB2016/001305, dated Mar. 17, 2017.
Izumi Yajima et al: "Volatile Flavor Components of Cooked Kaorimai (Scented Rice, O. sativa japonica )", Agricultural and Biological Chemistry, vol. 43, No. 12, Dec. 9, 1979 (Dec. 9, 1979), pp. 2425-2429, XP055332700, JP ISSN: 0002-1369, DOI: 10.1080/00021369.1979.10863850 p. 2429, left-hand col. paragraph 4-right-hand column, paragraph 3; table II p. 2425, left-hand column, paragraph 3.
Anthony K Q Kamassah et al: "The Physico-chemical Characteristics of Yeast Fermentation of two Mango (*Mangifera indica* Linn) Varieties", Food Science and Quality Management, 2013, pp. 45-56, XP055332697, Retrieved from the Internet:. URL:http://s3.amazonaws.com/academia.edu.documents/32789075/The_Physico-chemicalCha racteristics.pdf?AWSAccessKeyId= AKIAJ56TQJRTWSMTNPEA&Expires=1483635133&Signature= RJnKdl0M2nESh0dHc9Xy7Mpwjml=&response-content-disposition= inline; filename=IISTE International Journals 2013 Decemb.pdf [retrieved on Jan. 5, 2017] table 3.
Yutaka Mori et al.: "Flavor Components of Miso: Basic Fraction", Agricultural and Biological Chemistry, vol. 47, No. 7, Jul. 1983 (Jul. 1983), pp. 1487-1492, XP055332698, JP ISSN: 0002-1369, DOI: 10.1080/00021369.1983.10865811 tables II, III.
International Search Report for PCT/IB2016/001309, mailed Jan. 17, 2017.
Ulrich Krings et al: "Thin-layer high-vacuum distillation to isolate volatile flavour compounds of cocoa powder", European Food Research and Technology; Zeitschrift Fur Lebensmitteluntersuchung Und-Forschung A, Springer, Berlin, DE, vol. 223, No. 5, Feb. 14, 2006 (Feb. 14, 2006), pp. 675-681, XP019420493, ISSN: 1438-2385, DOI: 10.1007/500217-006-0252-X table 1.

(Continued)

*Primary Examiner* — Jyoti Chawla
(74) *Attorney, Agent, or Firm* — B. Aaron Schulman, Esq.; Stites & Harbison, PLLC

(57) ABSTRACT

Flavour modifying composition comprising one or more specific flavour modifying compounds, product comprising said flavour modifying composition, use of said flavour modifying composition for modifying taste perception in foodstuffs and beverages and method of improving taste perception in a foodstuff or beverage comprising adding said flavour modifying composition to said foodstuff or beverage.

6 Claims, 1 Drawing Sheet

(56) References Cited

OTHER PUBLICATIONS

International Search Report for PCT/IB2016/001272, mailed Jan. 23, 2017.
Written Opinion for PCT/IB2016/001272, mailed Jan. 23, 2017.

* cited by examiner

| Molecule | Benchtop Validation of Taste Modulation (applications tested) ||||||||||| 
| | Salt |||| Sweet ||||| Bitterness | Umami |
| | Salt Solution (0.2-1.0%) | Maggi (10%-100%) | Kikkomen Soy Sauce (10%-100%) | Cheese sauce (100%) | Sucrose Soluton (2-8%) | Sucrolose Solution (150-300 ppm) | Reb-A Solution (150-300 ppm) | Coke Life (100%) | Sprite ZERO (100%) | Dark Chocolate | Maggi (10%-100%) |
|---|---|---|---|---|---|---|---|---|---|---|---|
| 3-n-propylphenol | Y | Y | Y | Y | Y | Y | Y | dnt | dnt | dnt | Y |
| 3-ethylphenol | Y | Y | Y | Y | Y | Y | Y | dnt | dnt | dnt | Y |
| 3-methyl phenol (m-cresol) | Y | Y | Y | Y | Y | Y | Y | Y | Y | Y | Y |
| 2-dihydroxy-1,2,3-propanetricarboxylic acid (Hydroxycitric acid) | Y | Y | Y | Y | Y | Y | Y | dnt | dnt | dnt | Y |
| Garcinia Acid | Y | Y | Y | dnt | Y | Y | Y | dnt | dnt | dnt | Y | dnt = did not test

COMPOSITION COMPRISING TASTE MODULATION COMPOUNDS, THEIR USE AND FOODSTUFF COMPRISING THEM

FIELD OF THE INVENTION

The invention relates to a composition comprising taste modulation compounds, uses of these compositions and foodstuffs comprising them.

BACKGROUND OF THE INVENTION

The flavour industry is continuously seeking ways to enhance, alter or modify the taste of foodstuffs. One way of doing so is the addition of taste modulating compounds which cover a wide spectrum of applications such as improving the perception of sweet, savory, umami, and saltiness; masking bitterness, sourness, astringency and saltiness; and triggering effects such as warming, cooling or the stimulation of saliva.

In US patent application No. 2013/0115356 A1 sclareolide is used to attenuate the liquorice taste associated with *stevia* while U.S. Pat. No. 4,917,913 recites the use of sclareolide to enhance the organoleptic properties of foodstuffs such as the richness and creaminess of low fat ice cream, sweetness of foodstuffs and beverages which have been sweetened with non-nutritive sweeteners such as aspartame. However, the use of this compound is restricted to such sweeteners.

U.S. Pat. No. 5,683,737 attempts to modulate flavour and taste with glucono-delta lactone, addition of which is required at levels that lead to an accompanying mild acid taste. JP patent application No. 2012-070636A discloses ethyl guaiacol and ethyl furaneol as salt enhancers in soy sauce which can tolerate the smoke and caramel aroma of these compounds which restricts the use of these compounds.

Thus, there is still a need for flavour modifying compounds that do no not have the above drawbacks, such as detectable taste or specific application and can be used in a wide variety of foodstuffs and beverages.

BRIEF DESCRIPTION OF DRAWING

FIG. 1—The following flavour modifying compounds have been tested in bench top screening tests: m-cresol, 3-n-propylphenol, 3-ethylphenol, hydroxycitric acid and garcinia acid. The following taste modulations have been tested: salt enhancement, sweet enhancement, bitterness reduction, umami enhancement.

DETAILED DESCRIPTION

The applicant has found that flavour modifying compositions comprising certain flavour modifying compounds can be used in a wide variety of applications for modifying the flavour of foodstuffs and beverages. Thus, the first aspect of the invention relates to a flavour modifying composition comprising one or more flavour modifying compounds selected from the group consisting of m-cresol, 9-decen-2-one, 3-n-propylphenol, 3-ethylphenol, hydroxycitric acid, garcinia acid, and mixtures thereof.

The term "flavour modifying composition" as used herein is intended to mean that said composition can modify the sensory experience of edible compositions by enhancing, multiplying, potentiating, decreasing, suppressing, or inducing the taste, smell, texture, and/or flavour profiles of a natural or synthetic tastant, flavouring agent, taste profile, flavour profile, and/or texture profile in an animal or a human edible composition. The purpose of such modification is principally to increase the intensity of a desirable attribute, to replace a desirable attribute that is not present or somehow lost in the edible composition, or to decrease the intensity of an undesirable attribute. In particular, it is desirable to increase the intensity in saltiness sensation, sweetness sensation, sourness sensation, kokumi sensation, or umami sensation, or to suppress bitterness sensation. The "flavour modifying composition" can also enhance and/or modify the oral perceptions imparted through chemical sensing of non-fundamental taste properties (which are called "sensate"), including cooling, heat (pain), astringency, metallic, and salivation in the oral cavity. Particularly, the flavour modifying composition can decrease astringency sensation, and/or stimulate salivation (i.e. an increase in mouth moisture).

The term "flavour modifying compounds" as used herein is intended to mean taste modulating compounds and refers to molecules that modify taste and sensate perceptions (and/or sensations). In all cases, the specificity of such compounds is that they do not exhibit perceptible taste and aroma properties (taste-less and aroma-less). Thus, an important distinguishing feature of these "flavour modifying compounds" is that they modulate the flavour perception (and/or sensation) of a foodstuff, while being imperceptible if consumed alone.

Such flavour modifying compounds can be of synthetic origin or natural origin.

Modification of flavour includes the increase in saltiness sensation, increase in sweetness sensation, improvement of sugar-like qualities of high intensity sweeteners, reduction of bitterness and astringency, stimulation of salivation or increase in umami sensation.

In one embodiment, the flavour modifying composition is added to the foodstuffs or beverages in such an amount that the flavour modifying compound is present in the foodstuffs or beverages in an amount of 0.01 to 1000 ppb, preferably in an amount of 0.1 to 100 ppb, and more preferably in an amount of 0.1 to 10 ppb, when the flavour modifying compound is m-cresol, 3-n-propylphenol, or 3-ethylphenol.

In another embodiment, the flavour modifying composition is added to the foodstuffs or beverages in such an amount that the flavour modifying compound is present in the foodstuffs or beverages in an amount of 0.1 to 200 ppm, preferably in an amount of 1 to 100 ppm, and more preferably in an amount of 3 to 50 ppm, when the flavour modifying compound is 9-decen-2-one, hydroxycitric acid, or garcinia acid.

The terms "foodstuff", "edible compositions" and "food product" as used herein refer to an ingestible product, such as, but not limited to, human food, animal (pet) foods, and pharmaceutical compositions. Examples of foodstuffs may include, but are not limited to, snacks, confections, plant materials and meals which may or may not provide essential nutrients. Plant materials include cacao, cacao beans, coffee, coffee beans and tea leaves or powder. Non-limiting examples of foodstuffs include salad dressings, sauces, gravies, marinades, rubs, nutritional bars, baked goods, breads, caramel, cooked grains, meat products, poultry products, meat, poultry, fowl, fish, sea protein sources, beans, pasta, confectionery products, savoury snacks, dairy products, cheeses, yogurt, butter, margarine, ready to eat cereals, condiments and gravies.

Non-limiting examples of animal foods may include: pet food, dog food, cat food, ferret food, pocket pet food, rodent food, livestock feed, cattle feed, goat feed, pig feed, sheep feed, horse feed and the like. Pet foods such as foods for dogs and cats may be formulated according to the "Fédération européenne de l'industrie des aliments pour animaux familiers (FEDIAF)" or the "American Association of Feed Control Officials (AAFCO)" guidelines. These guidelines assure that pet foods are complete and balanced to meet all nutrient requirements of dogs and cats. Other embodiments of pet foods could include treats made for dogs and cats. These embodiments may not meet complete and balanced nutrient requirements as specified by FEDIAF and AAFCO.

The term "beverage" as used herein means a product that may be consumed orally by a human or animal and which provides water or other nutrients necessary to sustain health of the human or animal. In particular, the term "beverage" includes mixes and concentrates, including but not limited to, alcoholic and non-alcoholic ready to drink and dry powdered beverages. Non-limiting examples of beverages include soda, carbonated drinks, brewed beverages, dairy, drinkable yogurt, milk, coffee whiteners, nutritional drinks, nutritional beverages, soft carbonated beverages, soft non-carbonated fruit flavoured beverages, fountain beverages, frozen ready-to-drink beverages, soft non-carbonated beverages, juices, water, flavoured water, flavoured beverages, carbonated water, syrup, diet beverages, carbonated soft drinks, powdered soft drinks, as well as liquid concentrates (including liquid, frozen, and shelf stable), fountain syrups, cordials, fruit juices, fruit containing beverages, fruit flavoured beverages, vegetable juices, vegetable containing beverages, isotonic beverages, non-isotonic beverages, soft drinks containing a fruit juice, coffee and coffee-based drinks, coffee substitutes, cereal-based beverages, teas, teas including dry mix products as well as ready-to-drink teas (herbal and tea-leaf based), dairy products, soy products, fruit and vegetable juices and juice flavoured beverages as well as juice drinks, juice cocktails, nectars, concentrates, punches, other beverages processed with heating (infusions, pasteurization, ultra high temperature, ohmic heating or commercial aseptic sterilization) and hot-filled packaging, cold-filled products made through filtration, chemical preservation, and other preservation techniques. Particular embodiments of the carbonated beverages may include coke, diet coke, lemon-lime, orange, orange juice, heavy citrus, fruit flavoured, cream sodas, tea or tea-flavoured drinks, and root beer, for example. Particular embodiments of milk can be any suitable form including fat free milk, low fat milk, reduced fat milk, whole milk, powdered milk or a combination thereof.

In a further embodiment of the invention, the flavour modifying composition further comprises a solvent. The solvent not only allows for an exact dosage of the flavour modifying compound to the foodstuffs and beverages but also facilitates an even distribution of the flavour modifying compound in the foodstuffs and beverages.

Suitable solvents may be hydrophilic solvents such as water, propylene glycol, glycerol, ethanol and triacetin or hydrophobic solvents such as vegetable oils, for example palm oil, soybean oil, rapeseed oil, sunflower seed oil, peanut oil, coconut oil, olive oil or medium chain triglycerides (MCT). Medium chain triglycerides are triglycerides based on aliphatic fatty acids comprising 6 to 12 carbon atoms.

In a further embodiment of the invention, the flavour modifying composition further comprises a flavouring ingredient.

The terms "flavouring ingredient" and "flavouring" are intended to be understood as a compound that is recognized by a person skilled in the art as being able to impart or modify in a positive or pleasant manner the taste of a composition, and not simply as a compound having a taste. Such a flavour ingredient can be a natural substance, a nature-identical substance or an artificial substance. In general terms, these flavouring ingredients belong to chemical classes as varied as alcohols, aldehydes, ketones, esters, ethers, acetates, nitriles, terpenoids, nitrogenous or *sulphurous* heterocyclic compounds and essential oils. Many of these co-ingredients are in any case listed in reference texts such as the book by S. Arctander, Perfume and Flavour Chemicals, 1969, Montclair, N.J., USA, or its more recent versions, or in other works of a similar nature, as well as in the abundant patent literature in the field of flavour. The compounds of the present invention can easily be used to replace, either totally or partially, the sugars or sugars substitutes used as sweeteners when used in a foodstuff. By "sugars" or "sugars substitutes as sweeteners" it is meant any monosaccharide such as glucose, fructose, galactose, mannose or glucose, disaccharides such as lactose, sucrose or maltose, polysaccharides such as starch, oligosaccharide, sugar alcohols, corn syrup, high fructose corn syrup, "sugar alcohol" sweeteners such as erythritol, isomalt, lactitol, mannitol, sorbitol, xylitol, maltitol, lactitol, maltodextrin, and the like, or other carbohydrate forms such as gums that are starch based, vegetable based or seaweed based (beta glucan, *psyllium*). Additional sweeteners could include commonly used high intensity sweeteners such as aspartame, saccharin, acesulfame-K, cyclamate, sucralose, alitame, hydrogenated starch hydrolyzate (HSH), stevioside, rebaudioside A, rebaudioside B, rebaudioside C, rebaudioside D, rebaudioside F, rebaudioside G, rebaudioside H and other sweet *Stevia*-based glycosides, abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetinic acid, gypenoside, hematoxylin, hernandulcin, isomogrosides, in particular iso-mogroside V, lugduname, magap, mabinlins, micraculin, mogrosides (lo han guo), in particular mogroside IV and mogroside V, monatin and its derivatives, monellin, mukuroziosides, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rubusosides, saccharin and its salts and derivatives, scandenoside, selligueanin A, siamenosides, in particular siamenoside I, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, thaumatin, in particular thaumatin I and II, trans-anethol, trans-cinnamaldehyde, trilobatin and D-tryptophane, carrelame and other guanidine-based sweeteners, etc. Sweeteners also include cyclamic acid, mogroside, tagatose, neotame and other aspartame derivatives, D-tryptophan, glycine, isomalt, and hydrogenated glucose syrup (HGS). The term "sweeteners" also includes combinations of sweeteners as disclosed herein.

In a further embodiment of the invention, the flavour modifying composition further comprises one or more additional flavour modifying compounds, different to the one or more flavour modifying compounds of the invention.

In a preferred embodiment of the invention, the flavour modifying composition further comprises at least one compound selected from the group consisting of 5,6-dihydro-4-hydroxy-6-methyl-2H-pyran-2-one, dihydro-3-hydroxy-4,4-dimethyl-2(3H)-furanone (pantolactone), mevalonolactone, 2-methyl-gamma-butyrolactone, 5,6-dihydro-2H-pyran-2-one, 3-methyl-2(5H)-furanone, 5-methoxy-2-pyrrolidinone, hydroxyl-gamma-dodecalactone, *massoia* lactone, 2-pyrrolidone, pyroglutamic acid, 4-hydroxy-2-pyrrolidinone, N-methylcaprolactam, epsilon-caprolactam and 3-hydroxy-2-pyrone, and their mixtures thereof. In a particularly preferred embodiment, m-cresol is used in combination with pantolactone and/or 3-n-propylphenol. Without being bound by any theory, it is hypothesized that a synergistic effect occurs between the flavour modifying compound(s) of the present invention and the compound(s) selected from the above-mentioned group.

The second aspect of the invention is a product selected from the group of foodstuffs and beverages comprising the flavour modifying composition. In one embodiment the product comprises the flavour modifying compound of the flavour modifying composition in an amount of 0.01 to 1000 ppb, preferably in an amount of 0.1 to 100 ppb, and more preferably in an amount of 0.1 to 10 ppb, when the flavour modifying compound is m-cresol, 3-n-propylphenol, or 3-ethylphenol.

In another embodiment, the flavour modifying composition is added to the foodstuffs or beverages in such an amount that the flavour modifying compound is present in the foodstuffs or beverages in an amount of 0.1 to 200 ppm, preferably in an amount of 1 to 100 ppm, and more preferably in an amount of 3 to 50 ppm, when the flavour modifying compound is 9-decen-2-one, hydroxycitric acid, or garcinia acid.

The third aspect of the invention is the use of the flavour modifying composition for modifying the perception of sweetness, saltiness, umami, astringency, salivation and bitterness in foodstuffs and beverages.

The fourth aspect of the invention is a method of improving the perception of sweetness, saltiness, umami, astringency, salivation and bitterness in foodstuffs or beverages comprising
providing a foodstuff or beverage and
adding a flavour modifying composition comprising one or more flavour modifying compounds selected from the group consisting of m-cresol, 9-decen-2-one, 3-n-propylphenol, 3-ethylphenol, hydroxycitric acid, garcinia acid, and mixtures thereof.

In a first embodiment, the present invention provides a method for enhancing saltiness in foodstuffs or beverages.

In a second embodiment, the present invention provides a method for enhancing sweetness and/or improving the sugar-like taste perception of high intensity sweeteners in foodstuffs or beverages.

In a third embodiment, the present invention provides a method for enhancing umami in foodstuffs or beverages.

In a fourth embodiment, the present invention provides a method for reducing astringency in foodstuffs or beverages.

In a fifth embodiment, the present invention provides a method for increasing salivation in foodstuffs or beverages.

In a further embodiment, the present invention provides a method for reducing bitterness in foodstuffs or beverages.

EXAMPLES

Example 1—m-Cresol and 3-n-Propylphenol Added to Cheese Sauce

Five expert tasters consumed the Control and then cheese sauce comprising the different flavour modifying compounds. The presence of the different flavour modifying compounds lead to an increased perception of saltiness and increased salivation.

TABLE 1

Various Mixtures of 3-n-propylphenol and m-cresol added to cheese Sauce

| | Treatment ID | | | | | | |
|---|---|---|---|---|---|---|---|
| | Control | 1 | 2 | A | B | 3 | 4 |
| Formula: | | | | | | | |
| Cheese sauce alone | 100 | QS100 | QS100 | QS100 | QS100 | QS100 | QS100 |
| with added 3-n-propylphenol, ppb | 0 | 0.01 | 0.01 | 0 | 0.01 | 0 | 0.01 |
| with added m-cresol, ppb | 0 | 100 | 100 | 100 | 0 | 100 | 0 |
| Result: | | | | | | | |
| Salivation effect | no | yes | yes | yes | yes | yes | yes |
| Saltiness score* | 1 | >1 | 2.5 | 3 | 2 | 3.5 | 2.5 |

*Saltiness score: (1 - low . . . 5 - high). Not intended to communicate a magnitude increase since these are relative intensities.

Example 2—m-Cresol Added to Salt Condiment Mixture

Five expert tasters consumed the Control and then salt condiment mixtures with 100 ppb of m-cresol. It was shown that m-cresol amplifies saltiness and suppresses bitterness. When sodium is absent, as in the no-salt product, no modulation was witnessed. Since, saltiness from sodium chloride and bitterness from potassium chloride is multi-modally modulated with taste modulating chemistries, blends of sodium chloride with potassium chloride are perceived as saltier with reduced bitterness.

TABLE 2 m-cresol added to Salt Condiment Mixtures

| Item | Control | m-cresol, 100 ppb | Comments |
|---|---|---|---|
| Morton ® Lite Salt (50% less sodium)† used at 0.75% Results: | Salty Mineral Dirty Bitter | Excellent enhancement of saltiness Less dirty Much less bitter | m-cresol amplification of saltiness and suppression of bitter is obvious. |
| No salt, sodium-free salt‡ used at 0.75% Results: | Bitter Sour Acidic Slightly salty Dirty | Bitter, Sour Acidic Slightly salty Dirty Same as Control | No Effect - there is no sodium to modulate - bitter/sour |

†Mortone ® Lite Salt, Ingredient Label: Salt, Potassium Chloride, Calcium Silicate, Magnesium Carbonate, Dextrose, Potassium iodine
‡No Salt, sodium-free salt, Ingredient Label: Potassium Chloride, Potassium Bitartarate, Adipic Acid, Silicon Dioxide, Mineral Oil and Fumaric Acid

Example 3—Bench Top Screening Tests

The following flavour modifying compounds have been tested (alone) in bench top screening tests: m-cresol, 3-n-propylphenol, 3-ethylphenol, hydroxycitric acid, and garcinia acid. The following taste modulations have been tested: salt enhancement, sweet enhancement, bitterness reduction, umami enhancement.

Salt—Model Salt Solution—[Ranged from 0.2%-1.2% Salt]

Sodium chloride (NaCl) solutions were used as a source of a liquid salt model. NaCl solutions were evaluated without and with a water based solution of flavour modifying compound, typically at 5 ppm concentration when the flavour modifying compound is chosen between hydroxycitric acid, and garcinia acid. M-cresol, 3-n-propylphenol, and 3-ethylphenol are respectively used at a 0.001 ppm, 0.00001 ppm and 0.001 ppm concentrations. Up to five expert tasters consumed 1 g of NaCl solution alone (control), followed by 1 g of NaCl solution dosed with the different flavour modifying compounds. Comparison of saltiness intensity was noted and salty taste modulation by the flavour modifying compound was recorded. At each tested concentration, an increase in saltiness sensation is recorded.

Salt—Maggi® (Off-Shelf, Product Produced by Nestle) [Ranged from 10% Diluted to Full Strength]

Maggi® Seasoning (manufactured by Nestlé USA, Inc., Glendale, Calif.) was used as a source of liquid savory seasoning. Maggi® seasoning liquid was evaluated without and with a water based solution of flavour modifying compound, typically at a 5 ppm concentration when the flavour modifying compound is chosen between hydroxycitric acid, and garcinia acid. M-cresol, 3-n-propylphenol, and 3-ethylphenol are respectively used at a 0.001 ppm, 0.00001 ppm and 0.001 ppm concentrations. Up to five expert tasters consumed 1 g of Maggi® alone (control), followed by 1 g of Maggi® dosed with the different flavour modifying compounds. Comparison of saltiness intensity was noted and salty taste modulation by the flavour modifying compound was recorded. At each tested concentration, an increase in saltiness sensation is recorded.

Salt—Kikkomen Say Sauce (Full and Low Sodium) [Ranged from 10% Diluted to Full Strength]

Regular and/or low sodium soy sauce (Kikkoman's®) was evaluated without and with a water based solution of flavour modifying compound, typically at 5 ppm concentration, when the flavour modifying compound is chosen between hydroxycitric acid, and garcinia acid. M-cresol, 3-n-propylphenol, and 3-ethylphenol are respectively used at a 0.001 ppm, 0.00001 ppm and 0.001 ppm concentrations. Up to five expert tasters consumed 1 g of soy sauce alone (control), followed by 1 g of soy sauce dosed with then different flavour modifying compounds. Comparison of saltiness intensity was noted and salty taste modulation by the flavour modifying compound was recorded. At each tested concentration, an increase in saltiness sensation is recorded.

Salt—Cheese Sauce

Cheese sauce was purchased at a local grocery store. All cheese sauce samples were served at room temperature (~70° F.). Samples were stirred by hand prior to portioning to ensure even distribution of components. Approximately one ounce of cheese sauce was served into odorless, translucent, one-ounce cups. Up to five expert tasters consumed 5-10 g of cheese sauce alone (control), followed by 5-10 g of cheese sauce dosed with 5 ppm of flavour modifying compound when said compound is hydroxycitric acid. M-cresol, 3-n-propylphenol, and 3-ethylphenol are respectively used at a 0.001 ppm, 0.00001 ppm and 0.001 ppm concentrations. Comparison of saltiness intensity was noted and salty taste modulation by the flavour modifying compound was recorded. At each tested concentration of flavour modifying compound an increase in saltiness sensation is recorded.

Sweet—Model Sucrose Solution [Ranged from 1.0%-12.0% Sucrose]

Filtered water (Brita® Basic Faucet Filtration System) was used for all dilutions. Sucrose solutions were made up as a source of a liquid sweet model. Sucrose solutions were evaluated without and with a water based solution of flavour modifying compound, typically at 5 ppm concentration when the flavour modifying compound is chosen between hydroxycitric acid, and garcinia acid. M-cresol, 3-n-propylphenol, and 3-ethylphenol are respectively used at a 0.001 ppm, 0.00001 ppm and 0.001 ppm concentrations. Up to five expert tasters consumed 10-20 g of sucrose solution alone (control), followed by 10-20 g of sucrose solution dosed with different flavour modifying compounds. Comparison of sweetness intensity was noted and sweet taste modulation by the flavour modifying compound was recorded. At each tested concentration, an increase in sweetness sensation is recorded.

Sweet—Sucralose Solution [Ranged from 100 ppm-450 ppm Sucralose]

Filtered water (Brita® Basic Faucet Filtration System) was used for all dilutions. Sucralose solutions were made up as a source of a liquid sweet model. Sucralose solutions were evaluated without and with a water based solution of flavour modifying compound, typically at 5 ppm concentration when the flavour modifying compound is chosen between hydroxycitric acid, and garcinia acid. M-cresol, 3-n-propylphenol, and 3-ethylphenol are respectively used at a 0.001 ppm, 0.00001 ppm and 0.001 ppm concentrations. Up to five expert tasters consumed 10-20 g of sucralose solution alone (control), followed by 10-20 g of sucralose solution dosed with the different of flavour modifying compounds. Comparison of sweetness intensity was noted and sweet taste modulation by the flavour modifying compound was recorded. At each tested concentration, an increase in sweetness sensation is recorded.

Sweet—Reb-A Solution [Ranged from 100 ppm-450 ppm Reb-A]

Filtered water (Brita® Basic Faucet Filtration System) was used for all dilutions. Reb-A solutions were made up as a source of a liquid sweet model. Sucrelose solutions were evaluated without and with a water based solution of flavour modifying compound, typically at 5 ppm concentration when the flavour modifying compound is chosen between hydroxycitric acid, and garcinia acid. M-cresol, 3-n-propylphenol, and 3-ethylphenol are respectively used at a 0.001 ppm, 0.00001 ppm and 0.001 ppm concentrations. Up to five expert tasters consumed 10-20 g of Reb-A solution alone (control), followed by 10-20 g of Reb-A solution dosed with the different flavour modifying compounds. Comparison of sweetness intensity was noted and sweet taste modulation by the flavour modifying compound was recorded. At each tested concentration, an increase in sweetness sensation is recorded.

Sweet—Coke Life®-Off Shelf (a Product of Coca Cola Corp.)

Coke Life® (Coca Cola Corp.) was evaluated without and with a water based solution of m-cresol as flavour modifying compound, at 0.001 ppm concentration. Up to five expert tasters consumed 20-30 g of Coke Life® alone (control), followed by 20-30 g of Coke Life® dosed with the flavour modifying compound. Comparison of sweetness intensity was noted and sweet taste modulation by the flavour modifying compound was recorded. At 0.001 ppm concentration of m-cresol, an increase in sweetness sensation is recorded.

Sweet—Sprite ZERO®-Off Shelf, (a Product of Coca Cola Corp.)

Sprite ZERO® (Coca Cola Corp.) was evaluated without and with a water based solution of m-cresol as flavour modifying compound, at 0.001 ppm concentration. Up to five expert tasters consumed 20-30 g of Sprite ZERO® alone (control), followed by 20-30 g of Sprite ZERO® dosed with the flavour modifying compound. Comparison of sweetness intensity was noted and sweet taste modulation by the flavour modifying compound was recorded. At 0.001 ppm of m-cresol, an increase in sweetness sensation is recorded.

Bitter—Dark Chocolate

Dark chocolate (Lindt® 85% cocoa) was melted, and used as a base for samples without (control) or with m-cresol as flavour modifying compound, at 0.001 ppm concentration. Up to five expert tasters consumed 10-20 g of chocolate alone (control), followed by 10-20 g of chocolate dosed with the flavour modifying compound. Comparison of bitterness, sweetness and salivation intensity was noted and taste modulation by the flavour modifying compound was recorded. At 0.001 ppm of m-cresol, a decrease in bitterness sensation is recorded. Additionally, an increase in sweetness and salivation is recorded.

Umami—Maggi® (Off-Shelf, Product Produced by Nestle) [Ranged from 10% Diluted to Full Strength]

Maggi® Seasoning (manufactured by Nestlé USA, Inc., Glendale, Calif.) was used as a source of liquid savory seasoning. Maggi® seasoning liquid was evaluated without and with a water based solution of flavour modifying compounds, typically at 5 ppm concentration when the flavour modifying compound is chosen between hydroxycitric acid, and garcinia acid. M-cresol, 3-n-propylphenol, and 3-ethylphenol are respectively used at a 0.001 ppm, 0.00001 ppm and 0.001 ppm concentrations. Up to five expert tasters consumed 1 g of Maggi® alone (control), followed by 1 g of Maggi® dosed with the different flavour modifying compounds. Comparison of saltiness intensity was noted and umami taste modulation by the flavour modifying compound was recorded. At each tested concentration, an increase in umami and saltiness sensations is recorded.

The invention claimed is:

1. A method of improving perception of a taste selected from the group consisting of saltiness, astringency, salivation, bitterness, and mixtures thereof in a foodstuff or beverage, comprising:
    providing said foodstuff or beverage; and
    adding to said foodstuff or beverage a taste modulating composition comprising a taste modifying compound selected from the group consisting of m-cresol, 3-n-propylphenol, 3-ethylphenol, and mixtures thereof, wherein m-cresol, 3-n-propylphenol, and/or 3-ethylphenol are the only alkylphenols in the taste modulating composition, and wherein the taste modifying compound includes m-cresol;
    wherein the taste modifying compound is present in a total amount of 0.01 to 1000 ppb in said foodstuff or beverage and does not exhibit any perceptible taste and aroma properties;
    wherein the taste modifying compound modifies the perception of the taste selected from the group consisting of saltiness, astringency, salivation, bitterness, and mixtures thereof in the foodstuff or beverage;
    wherein said foodstuff or beverage contains sodium chloride and potassium chloride; and
    wherein the m-cresol amplifies saltiness and suppresses bitterness in said foodstuff or beverage.

2. The method according to claim 1, wherein the taste modifying compound is present in the foodstuff or beverage in a total amount of 0.01 to 100 ppb.

3. The method according to claim 1, wherein the taste modifying compound is present in the foodstuff or beverage in a total amount of 0.01 to 10 ppb.

4. A product selected from said foodstuff or beverage prepared by the method according to claim 1.

5. The method according to claim 1, further comprising adding to said foodstuff or beverage a hydrophilic solvent selected from the group consisting of water, propylene glycol, glycerol, ethanol and triacetin, or a hydrophobic solvent selected from the group consisting of vegetable oils and medium chain triglycerides.

6. A product selected from said foodstuff or beverage prepared by the method according to claim 5.

* * * * *